No. 788,088. PATENTED APR. 25, 1905.
J. F. BERNDT.
CONCAVE AND CYLINDER FOR THRESHING MACHINES.
APPLICATION FILED NOV. 9, 1904.
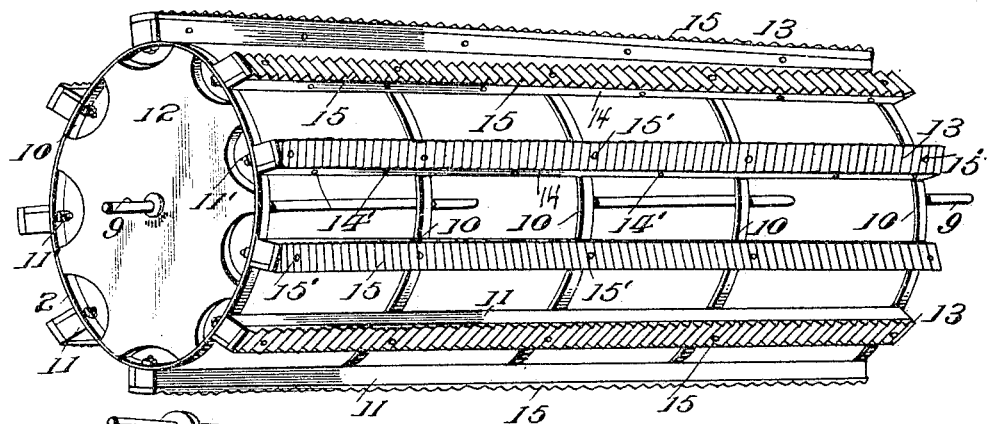
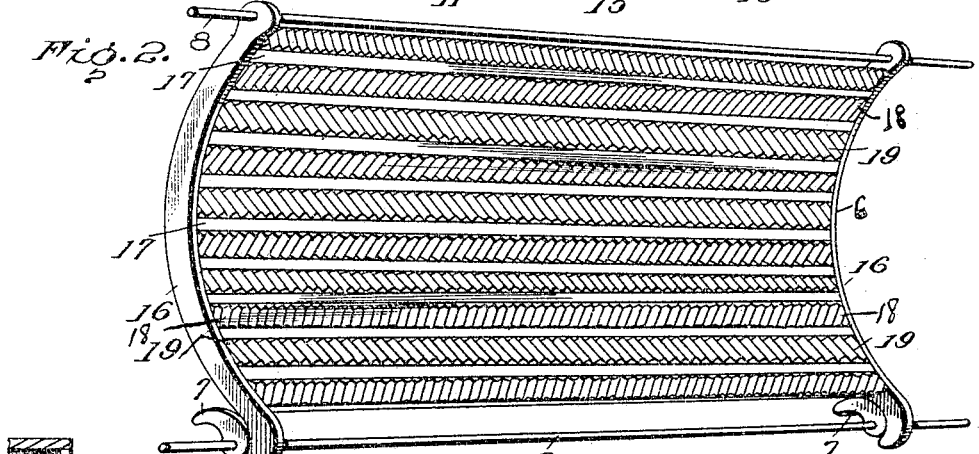
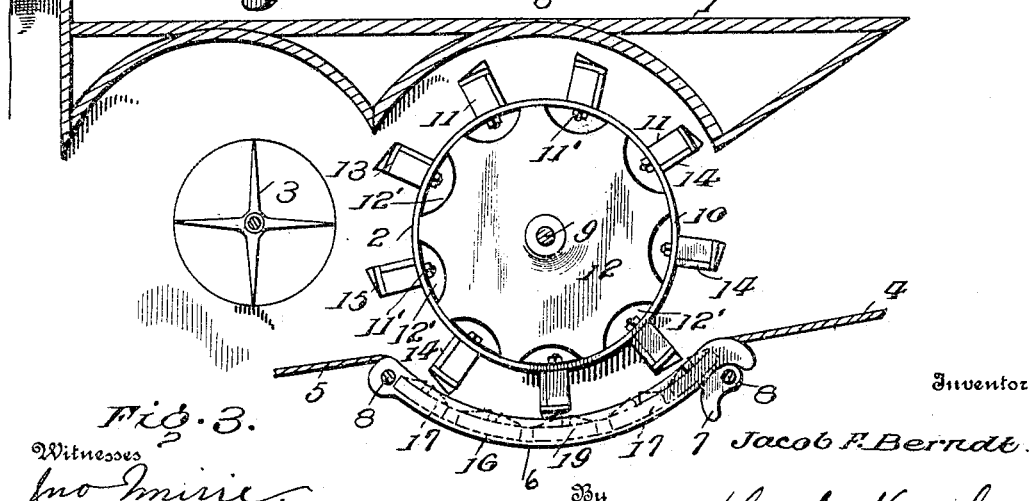
Witnesses
Jno Mirie
W. A. Williams
Inventor
Jacob F. Berndt.
By
Herrick & Herrick
Attorneys No. 788,088.                                        Patented April 25, 1905.

UNITED STATES PATENT OFFICE.

JACOB F. BERNDT, OF FESSENDEN, NORTH DAKOTA.

CONCAVE AND CYLINDER FOR THRESHING-MACHINES.

SPECIFICATION forming part of Letters Patent No. 788,088, dated April 25, 1905.

Application filed November 9, 1904. Serial No. 232,016.

*To all whom it may concern:*

Be it known that I, JACOB F. BERNDT, a citizen of the United States, residing at Fessenden, in the county of Wells and State of North Dakota, have invented new and useful Improvements in Concaves and Cylinders for Threshing-Machines, of which the following is a specification.

The present invention relates to concaves and cylinders for threshing-machines and has for its object the provision of a rubbing-cylinder and rubbing-concave to take the place of the ordinary spike-cylinder and spike-concave commonly used in connection with threshers. By using a rubbing concave and cylinder the grain while passing through the machine is subjected to a rubbing action and is not cut, as is the case with an ordinary spike cylinder and concave.

By the use of the present device the grain is left soft and is easily cleaned, there being no chaff or cut straw produced during the operation. Furthermore, by the structure which will be more specifically hereinafter set forth the objectionable feature of loose and bent spikes which arises in the ordinary spike-cylinder is entirely removed.

The structure of the invention will be more specifically set forth in the following description and is fully illustrated in the accompanying drawings, in which—

Figure 1 is a perspective view of a cylinder provided with the improved rubbing members. Fig. 2 is a perspective view of a concave provided with rubbing concave sections. Fig. 3 is a view illustrating the concave and cylinder in their relative positions in a thresher, sufficient parts of the thresher being shown to illustrate the operation of the present invention.

Referring more particularly to the drawings, 1 is the frame of the thresher, forming a box-covering for the cylinder 2, while 3 is an ordinary beater or braddle. As in the ordinary construction of a thresher, the grain-board 4 is disposed forward of the cylinder 2, while the straw-board extends rearwardly therefrom beneath the beater 3. Disposed beneath the cylinder 2 and between the grain-board 4 and straw-board 5 is the concave 6, which is pivotally mounted and has the adjusting members 7, carried upon the concave, rod 8, which engage with the concave for the purposes of dropping and raising the same.

With reference to the cylinder 2 there is provided the operating and supporting shaft 9 of an ordinary construction. This cylinder comprises the cylinder-bands 10, secured to which are the transverse supporting members 11 by means of bolts 11', which engage in the end bands 10. Within each end band 10 there is disposed a plate 12, having cut-out portions 12' therein for permitting easy access to the securing-bolts 11'. Removably mounted upon the transverse members 11 are the rubbers 13, which comprise L-shaped plates, the depending portions 14 of which are secured to the side faces of the transverse supporting members 11 by means of bolts 14', while the upper portions of these plates rest upon the upper face of the transverse members and are provided with corrugations 15, which form a rubbing means when coming in contact with the grain. For more firmly securing these rubbers 13 upon the supporting members the bolts 15' pass through the upper face thereof. It will be seen that by this construction the rubbers are removably secured to their supporting means and by their angular formation serve to protect the supporting members in the rotation and operation of the cylinder. Furthermore, by providing the depending portions 14 of these rubbers there is obviated the danger of loosening the same which would arise if merely an ordinary plate were disposed upon the upper face of the supporting members 11.

The concave 6 comprises the supporting frames or holders 16 16, between which extend the concave-sections 17. Each of these concave-sections has disposed upon its upper face two corrugated rubbing-plates 18 and 19, the corrugations of the plate 18 extending in the opposite direction to those of the plate 19. The concave 6, as heretofore set forth, is suitably pivotally mounted within the thresher-frame and is adjustable by means of the members 7.

The construction of the present invention has been specifically pointed out in the foregoing description, and it is understood in the operation of the machine the grain is fed from the grain-board 4 and is operated upon by the rubbers 13 in coöperation with the rubbing-plates 18 and 19 of the concave during the rotation of the cylinder 2. By this construction, therefore, there is produced a rubbing action for breaking up and separating the grain and straw.

Various minor changes may be introduced in the construction of the present device without departing from the spirit of the invention, the main object of which is to provide a rubbing concave and cylinder in the place of the ordinary spike cylinder and concave.

What is claimed, and desired to be protected by Letters Patent, is—

1. In a thresher, the combination of a concave, rubbing-plates mounted thereon, each of said plates comprising duplicate corrugated members, the corrugations of one member inclining reversely from the corrugations of the adjacent member, a cylinder, and rubber members removably secured thereon, substantially as described.

2. In a thresher, the combination with a concave having rubbing members thereon, a cylinder, transverse supporting members removably secured to the cylinder, and L-shaped rubber members having their upper face corrugated and provided with depending portions engaging with the side faces of the transverse members, each of said members having its corrugations inclined in a direction reverse to the inclination of the corrugations of the next succeeding member, substantially as described.

3. In a threshing-machine, a concave, concave-sections mounted thereon having corrugated rubbing-plates comprising duplicate members each provided with corrugations extending in opposite directions, and a cylinder having rubbing members adapted to coöperate with the rubbing-plate of the concave-sections, substantially as described.

4. In a thresher, the combination of a concave, a concave-section mounted thereon provided with spaced corrugated rubbing-plates, each of said plates comprising duplicate members having corrugations extending in opposite directions and a cylinder coöperating with the concave provided with L-shaped rubbers having corrugated upper surfaces and depending side portions, substantially as described.

5. In a thresher, the combination with a concave, having rubbing-plates thereon, a cylinder, transverse supporting members removably secured thereto, and rubbers comprising L-shaped plates detachably secured to the transverse members, the upper portion of said plates being corrugated and the depending portions thereof engaging the sides of the transverse members and extending to and bearing against the cylinder, substantially as described.

In testimony whereof I affix my signature in presence of two subscribing witnesses.

JACOB F. BERNDT.

Witnesses:
W. E. MACDONALD,
MARK E. WILSON.